S. BOWERS.
Broiler.
No. 80,125. Patented July 21, 1868.
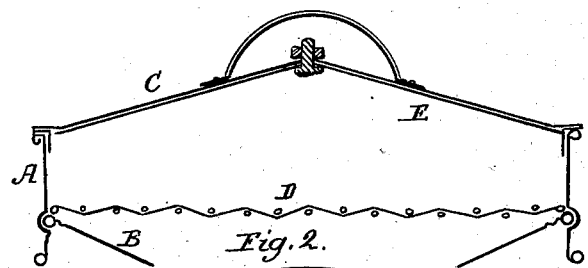
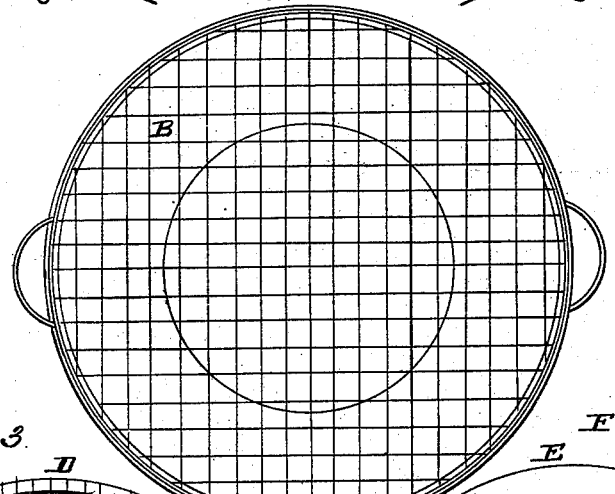
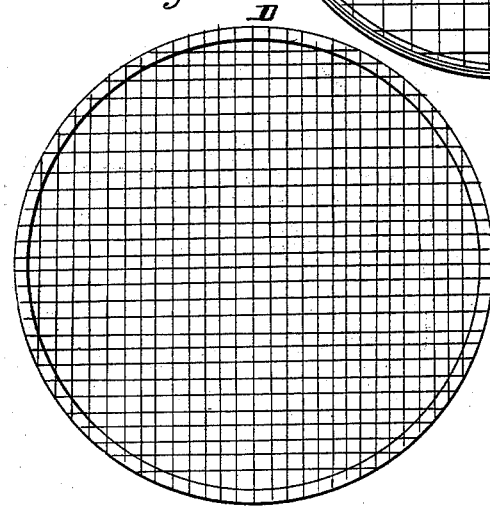
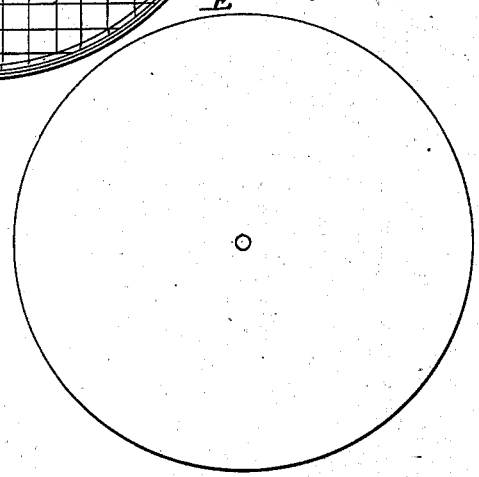
Witnesses:
John L. Lewis.
Charles Hetchum.
Inventor:
Sylvester Bowers.

UNITED STATES PATENT OFFICE.

SYLVESTER BOWERS, OF PENN YAN, NEW YORK.

IMPROVEMENT IN BROILERS.

Specification forming part of Letters Patent No. 80,125, dated July 21, 1868.

*To all whom it may concern:*

Be it known that I, SYLVESTER BOWERS, of Penn Yan, in the county of Yates and State of New York, have invented a new and useful Improvement in Culinary Utensils; and I do hereby declare that the following is a full, clear, and exact description of the construction and operation of the same, reference being had to the annexed drawings, making a part of this specification, in which—

Figure 1 is a vertical section; Fig. 2, a bird's-eye view. Fig. 3 is the grate, and Fig. 4 is a reflector.

The letters of reference refer to the same parts in each figure.

The nature of my invention consists in making a culinary utensil that may be used for various purposes by removing and substituting other parts that all belong to the same invention. It may be used for broiling meat or fish, toasting bread, baking bread, biscuit, or potatoes, popping corn, roasting coffee, and steaming any kind of food, and by the peculiar construction and arrangement of the parts the whole may be readily cleaned, and a grate for each purpose may belong to it, so that one kind of food cannot impart its flavor to another by not being perfectly cleaned after using.

To enable others skilled in the art to make and use my invention, I will proceed to describe its mode of construction and operation.

A is a band or hoop. It may be made of sheet metal to make it weigh but little, or may be made of cast metal. It may be made any size required, and when made of sheet metal it should have a groove that will receive the periphery of the annular rim B, so as to securely hold the same, and when made of cast metal the rim B may be cast in connection with it.

B is an annular rim. It is made to fit within a groove in the hoop A, or is cast with the hoop when it is cast. It must be made with the inner edge the lowest, so that the upper surface will be inclined inward, so that whatever drops upon it will readily run off and fall through the stove-hole, over which it is placed, into the fire. This rim must be placed so high in the hoop that the lowest part will not be so low as the lower edge of the hoop, for the purpose of causing the hoop to support all the parts, and whatever is placed upon them, and thus prevent tilting by neglect or carelessness.

C is the cover. It is made conical in form, and made of sheet metal, and may be held on the hoop A by a hinge or flange, as preferred. Its use is to cover the utensil, so that when used upon a stove with the cover off the stove, it will not interfere with the draft of the stove, and prevent smoke escaping within the kitchen; also to retain heat. It is provided with a reflector that may be applied when baking, and removed when broiling, if desired.

D is the grate. It must be made to fit loosely within the hoop A and rest upon the rim B. It may be made of cast metal, wire, or flat bars of iron, as preferred, and the meshes of any size required. Smaller meshes are required for roasting coffee than for broiling or baking. Each utensil may be provided with a series of grates for the various purposes for which it may be used.

E is a reflector. It may be made of tin or other material. It is shaped to suit the inside of the cover C. It must be made so that it may readily be placed within or removed from the cover. It may be held by a small screw-bolt, as represented in Fig. 1. When one is injured by use or otherwise another may be readily put in its place. This is required when baking, or using the utensil upon a stove with the covers on, or when a more intense heat is required.

Having thus fully described my invention, what I claim as new, and desire to secure by Letters Patent, is—

The hoop A, the annular rim B, the grate D, and the reflector E, all constructed and arranged substantially as herein shown and described, and for the purpose set forth.

SYLVESTER BOWERS.

Witnesses:
JOHN L. LEWIS,
CHARLES KETCHUM.